Figure 1:
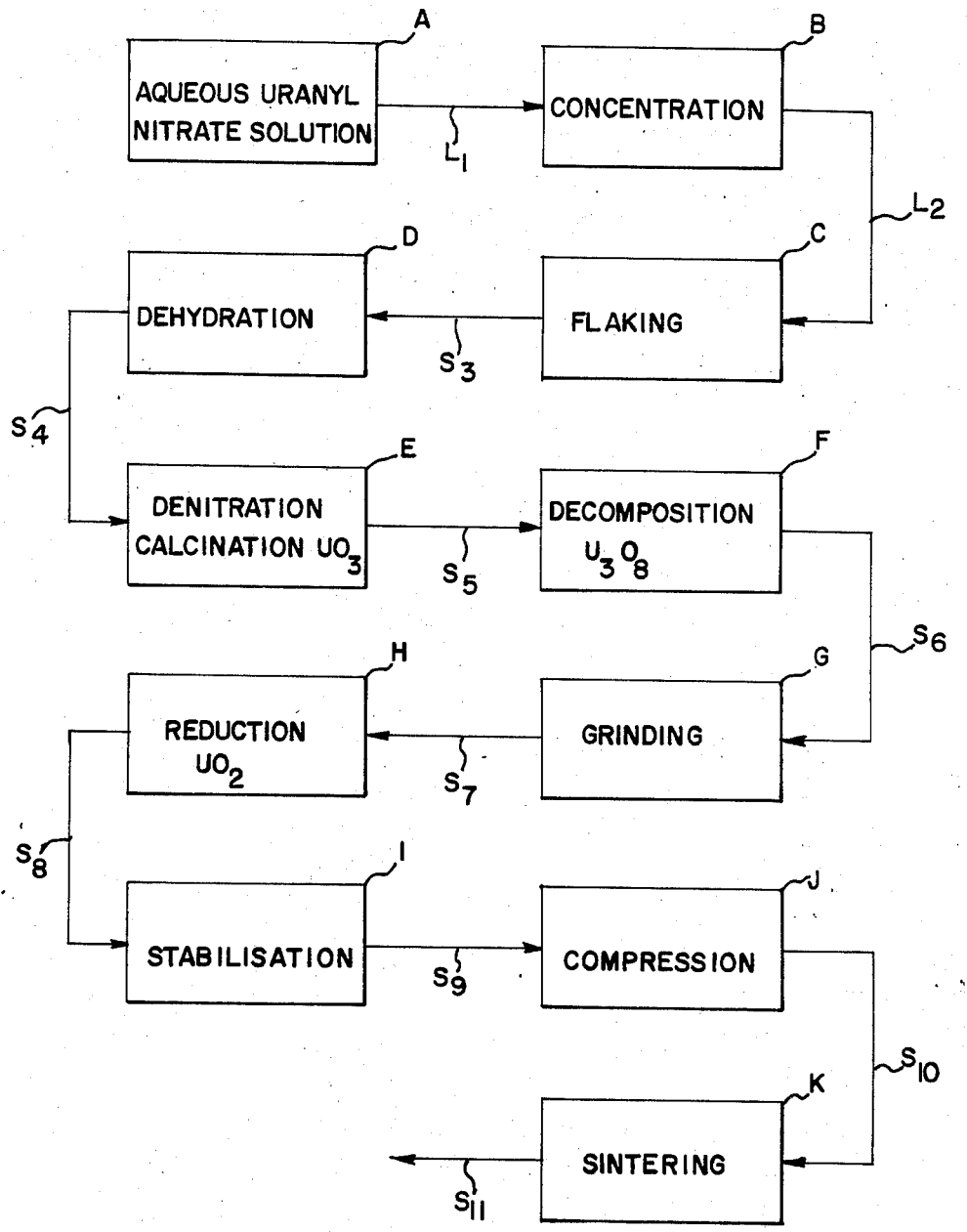

United States Patent [19]

Bachelard et al.

[11] Patent Number: 4,687,601
[45] Date of Patent: Aug. 18, 1987

[54] PROCESS FOR THE PREPARATION OF PULVERULENT METALLIC OXIDES FROM METALLIC NITRATES

[75] Inventors: Roland Bachelard; Philippe Joubert, both of Lyons, France

[73] Assignee: Comurhex, France

[21] Appl. No.: 674,174

[22] Filed: Nov. 21, 1984

[30] Foreign Application Priority Data

Nov. 25, 1983 [FR] France .................. 83 19173

[51] Int. Cl.$^4$ .............. C01G 43/01; C01G 43/025; C09K 11/04; G21G 4/00
[52] U.S. Cl. ............................ 252/638; 252/643; 264/0.5; 423/260; 423/261
[58] Field of Search .............. 423/260, 261; 252/673, 252/638; 264/0.5

[56] References Cited

U.S. PATENT DOCUMENTS

| 3,761,547 | 9/1973 | Grossman et al. | 423/261 |
| 4,364,859 | 12/1982 | Ohtsuka et al. | 423/261 |
| 4,397,778 | 8/1983 | Lloyd | 252/643 |
| 4,409,157 | 10/1983 | Haas et al. | 252/643 |

Primary Examiner—Edward A. Miller
Attorney, Agent, or Firm—Jones, Day, Reavis & Pogue

[57] ABSTRACT

Process for the preparation of pulverulent metallic oxides with predetermined reactivity which is adjusted by the specific surface area, which are intended to be subjected to subsequent conversions, by thermal treatment of corresponding nitrates in the form of an aqueous solution or of a solids material, consisting of hydrated uranyl nitrate, on its own or in admixture with at least one of thorium nitrate, cerium nitrate and plutonium nitrate, which process is characterized in that it consists of two treatment stages:

(a) the first stage essentially consisting of incompletely dehydrating the hydrated uranyl nitrate.
(b) the second stage essentially consisting of decomposing the product resulting from the first stage by calcination under controlled steam pressure.

The process is used for obtaining uranium oxide on its own or in admixture with thorium oxide, cerium oxide and plutonium oxide, with a view to subsequent chemical conversions and/or sintering.

15 Claims, 1 Drawing Figure

PROCESS FOR THE PREPARATION OF PULVERULENT METALLIC OXIDES FROM METALLIC NITRATES

This invention relates to a process for the preparation of pulverulent metallic oxides with predetermined reactivity, adjusted by the specific surface area by thermal treatment of corresponding nitrates, in the form of an aqueous solution or a solids material consisting of uranyl nitrate on its own or in admixture with at least one of thorium nitrate cerium nitrate and plutonium nitrate.

In the context of the present invention, the term "metallic oxides" is to be understood as designating uranium oxide $UO_3$ on its own, or uranium oxide $UO_3$ in admixture with at least one of thorium oxide ($ThO_2$), cerium oxide ($CeO_2$) or plutonium oxide ($PuO_2$).

The term "predetermined reactivity" is meant by the Applicant to define the most expedient specific surface area which metallic oxides are desired to have to maximize their capability for reactions subsequent to denitration, such as thermal conversion of $UO_3$ to $U_3O_8$, stable oxides permitting prolonged storage prior to their subsequent reduction or the direct reduction of $UO_3$ to $UO_2$ followed by hydrofluoridation by hydrofluoric acid or even the production of uranium oxide powders or mixed oxide powders with a ceramic quality to be converted into nuclear fuels by compacting them in the form of pellets and sintering them.

When $UO_3$ on its own is directly reduced to $UO_2$, followed by the hydrofluoridation of $UO_2$ to $UF_4$, the reactivity of $UO_2$ is linked correlatively to the specific surface area and to the porosity of the $UO_3$ resulting from denitration. It is desirable that the capacities for the direct reduction of $UO_3$ to $UO_2$ and for the hydrofluoridation of $UO_2$ to $UF_4$ are adjusted on request during the denitration of hydrated uranyl nitrate by the production of uranium oxide $UO_3$ having a specific surface area and a porosity which has been adapted to each technique.

Whenever $UO_3$ is thermally converted to $U_3O_8$, with a view to providing a stable oxide which does not rehydrate during storage prior to the reduction to $UO_2$, this conversion is carried out with a great reduction in the specific surface area of the starting product to the extent that, in order to obtain a uranium dioxide having sufficient reactivity, that is a developed specific surface, it is often necessary to convert $U_3O_8$ into ammonium diuranate, which subsequently decomposes to $UO_3$ which has a large specific surface area and which, after reduction, provides a uranium dioxide with sufficient reactivity.

In the case of the production of metallic oxide powders with a ceramic quality, which are intended for the production of nuclear fuels, metallic oxides, such as uranium dioxide ($UO_2$) on its own or in admixture with at least one of thorium oxide ($ThO_2$), cerium oxide ($CeO_2$) and plutonium oxide ($PuO_2$), it is known that the sintering of such powders in a reducing atmosphere enables pellets of high density to be obtained, provided that powders with a large specific surface area are used and that a procedure of optimum sintering is carried out for each value of specific surface area (Treatise on inorganic chemistry by Paul Pascal, volume XV, pages 300 to 304, edition 1961).

Mixed nuclear fuels are generally prepared by co-precipitation, such as by hydrolysing mixed solutions of nitrates of heavy metals and thermally decomposing them, but according to one variant, they may be produced by mixing suitable oxides, each oxide having been previously alone obtained by precipitation and thermal decomposition.

At present, the only processes known for obtaining $UO_2$ on its own or in admixture with at least one of thorium oxide, cerium oxide and plutonium oxide produce, with regard to uranium, intermediates consisting of $UO_3$ or a mixture of $UO_3$ and $U_3O_8$, the specific surface area of which is very small, only infrequently exceeding one square meter per gramme, or very large, for example in the order of from 10 to 30 $m^2.g^{-1}$. These processes sometimes go through chemical addition stages which enable the specific surface area desired by the user to be approached, for example from 1 to 15 $m^2g^{-1}$. However this addition stage is the source of major problems demonstrated by an increase in cost, a complication of the process and above all environmental nuisances.

Whenever uranium trioxide ($UO_3$) is produced by thermal denitration of hydrated uranyl nitrate, by the reaction $$UO_2(NO_3)_2,6H_2O \rightarrow UO_3 + 2NO_2 + O_2 + 6H_2O,$$

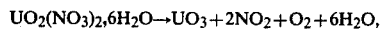

it is known that the $UO_3$ obtained generally has a small specific surface area.

Numerous processes for obtaining uranium trioxide by denitration have already been described in the relevant literature. Thus, the publication "Uranium Production Technology" edited by Charles D. Harrington and Archie E. Ruehle, New York, edition 1959, pages 181 to 191, gives several processes for the thermal denitration of uranyl nitrate hexahydrate.

A first process, of the discontinuous type, consists of thermally treating a concentrated solution of uranyl nitrate hexahydrate and maintaining, with stirring, the combustion gases at a controlled temperature of 621° C. for one and a half hours, then maintaining these gases at a temperature of 510° C. for 5 hours, and, finally, cooling the pulverulent product obtained over a period of about 30 minutes.

However, as the author himself admits, this process suffers from the particular disadvantages which limit the development thereof. Indeed, the pulverulent product obtained does in fact consist of a mixture of $UO_3$ and $U_3O_8$, this second oxide forming on the walls of the reactor which have been heated to a higher temperature than the temperature in the interior of the said reactor. Moreover, if the denitration temperature is too high it may lead to the caking of the mixture of the aforementioned oxides, whereas if the denitration temperature is too low, the oxide mixture still contains uranyl nitrate and water. Finally, in the most favourable case, that is when the pulverulent product obtained is $UO_3$, which is subsequently reduced to $UO_2$, the latter has poor reactivity with regard to hydrofluoric acid, and this is, considered by the author himself as a consequence of the small specific surface area of the uranium trioxide obtained (0.73 $m^2/g$).

In order to improve the reactivity of the uranium dioxide, the author advocates the use of certain artifices, such as the introduction of sulphuric acid into the uranyl nitrate solution which has been subjected to thermal denitration. However, these artifices have limited efficiency since the $UO_3$ produced does not have a specific surface area in excess of 2 $m^2.g^{-1}$.

A further process, of known type, consists of thermally decomposing the uranyl nitrate hexahydrate by the introduction of an aqueous solution containing it into a bed of pulverulent uranium trioxide which has been maintained at the denitration temperature and subjected to stirring. The dissolved uranyl nitrate is thermally decomposed in a trough reactor, the base of which is electrically heated by direct contact between the uranyl nitrate solution and the hot pulverulent $UO_3$ filling the trough of the said reactor, the denitration medium being maintained at a temperature of from 510° C. to 538° C. The continuous stirring of the pulverulent bed is ensured by providing the denitration reactor with a stirring device having a horizontal shaft, the arms of which, in a T-shape, maintain the stirring of the said bed. As it is formed, the $UO_3$ is extracted from the reactor, while the gaseous effluents are trapped and treated.

Although this process provides the advantage of being known, it suffers from disadvantages similar to those mentioned in the case of the aforementioned discontinuous process for the denitration of uranyl nitrate hexahydrate. Indeed, the pulverulent product obtained may be a mixture of $UO_3$ and $U_3O_8$ as the second oxide may be formed on the superheated walls of the reactor. Moreover, if the denitration temperature is not correctly controlled, it may cause the caking of the uranium oxide mixture if it is too high, or provide a uranium oxide mixture which still contains uranyl nitrate and water if it is too low. Finally, after the pulverulent product obtained by this process has been reduced to uranium dioxide, the latter also has poor reactivity with regard to hydrofluoric acid in the subsequent fluoridation stage, as was recognised by those skilled in the art, the poor reactivity being associated with the small specific surface area (less than 1 $m^2.g^{-1}$).

It is also known to denitrate thermally the uranyl nitrate hexahydrate in a fluidized bed. Such a process is described in the publication "The Thermal denitration of uranyl nitrate in a fluidised bed reactor" by the Australian Atomic Energy Commission, July 1974 (ISBN 0-642-00645-8), pages 1 to 18. This process consists of finely grinding a concentrated solution of uranyl nitrate in a fluidized bed (using air or steam) of uranium trioxide which is approximately maintained at a temperature of 270° C. The $UO_3$ produced by the thermal denitration develops on the granular particles of $UO_3$ which are initially present in the fluidized bed, or even forms new granular particles which are in turn brought to a state of fluidization. However, the uranium trioxide produced by this process, which is then subjected to a reduction, provides uranium dioxide which has poor reactivity during the subsequent fluoridation stage. This poor reactivity seems, once again, to be the consequence of the small specific surface area of the $UO_3$ produced during thermal denitration, this surface area remaining below one $m^2.g^{-1}$.

Therefore, in order to increase the reactivity of the $UO_3$ produced by the thermal denitration of the uranyl nitrate in a fluidized bed, the authors of the process also advocates the introduction of sulphate ions into the uranyl nitrate solution to be treated, as the relevant literature had already recommended, but the results produced show that, in this case, the BET specific surface area of the $UO_3$ produced does not exceed 1.5 $m^2.g^{-1}$.

Thus, all the known processes which have been described in the relevant literature for the production of uranium trioxide by thermal denitration of uranyl nitrate lead to the production of $UO_3$ with a small specific surface area which does not exceed 2 $m^2.g^{-1}$, which, by reduction, produces uranium dioxide with mediocre reactivity in the subsequent stage of fluoridation.

However, in spite of this poor reactivity, this process has enjoyed normal industrial development as thermal denitration remains a straightforward process which leads to the production of $UO_3$ without the production of effluents which pollute the environment.

Whenever it is desirable to provide uranium dioxide with good reactivity with regard to hydrofluoric acid, or with good sintering capacity, it is known to treat the aqueous uranyl nitrate solution with ammonia with a view to precipitating the ammonium diuranate which is subsequently thermally decomposed to $UO_3$ with a large specific area which may vary between 10 and 30 $m^2g^{-1}$.

However, no matter how interesting such a process is, it suffers from the disadvantages of consuming nitric acid and ammonia and also producing liquid effluents of ammonium nitrate which do not have a straightforward use.

From these two types of process, one of which leads to the production of uranium trioxide with a small specific surface area and consequently poor reactivity, the other producing uranium trioxide with a large specific area but at the cost of the production of environmental nuisances, a process was proposed for thermal denitration by addition of a large quantity of ammonium nitrate to the metallic nitrate.

Thus, Belgian Pat. No. 891,819 describes a conversion process by thermal decomposition of concentrated metallic nitrates for the production of metallic oxide powders ready for densification by sintering, this process consisting of the thermal decomposition at a temperature of from 300° C. to 800° C. of mixtures of nitrates of heavy metal and ammonium nitrate.

Although the addition of ammonium nitrate leads to the formation of good quality ceramic powders, without requiring a precipitation stage, such a process suffers from the major disadvantages on the one hand of consuming a large quantity of ammonia and on the other hand of causing a considerable increase in the volume of gaseous effluents to be retreated resulting in interest dwindling in such a process, and especially as a result of the risks involved in the thermal decomposition of ammonium nitrate.

In spite of the aforementioned disadvantages, the Applicant continued his research and found and perfected a process for the preparation, by thermal denitration, of pulverulent metallic oxides, with predetermined reactivity and which are adjusted, as desired, owing to the specific surface area which may be easily selected in the range of from 0.1 $m^2.g^{-1}$ to 100 $m^2.g^{-1}$, without the intervention of auxiliary chemical agents.

According to the present invention, the process for the preparation of pulverulent metallic oxides of predetermined reactivity which is adjusted by the specific surface area, consisting of the thermal treatment of corresponding nitrates in the form of an aqueous solution or a solids material consisting of hydrated uranyl nitrate on its own or in admixture with at least one of thorium nitrate, cerium nitrate and plutonium nitrate, is characterised in that it consists of the following two treatment stages:

(a) the first stage essentially consisting of dehydrating incompletely the hydrated uranyl nitrate, (b) the second stage essentially consisting of decomposing the product resulting from the first stage by calcination under controlled steam pressure.

An object of the present invention is to provide a process for the thermal decomposition of heavy metals in solid form or in an aqueous solution, with a view to the direct production of powders having a ceramic quality and with an exact and adjusted specific surface area, these powders being ready for the straightforward conversion into nuclear fuel pellets containing metallic oxides in admixture.

A further object of the present invention is to provide $UO_3$ having a specific surface area which has been adapted as required, in processes for the production of uranium hexafluoride consisting of the reduction of uranium trioxide to uranium dioxide, the fluoridation of uranium dioxide by hydrofluoric acid and the action of fluorine on the uranium tetrafluoride leading to the desired uranium hexafluoride, and in processes for the production of uranium dioxide powders with a ceramic quality which are intended for the production of nuclear fuel.

A further object of the present invention is to provide a process for the production of a metallic oxide powder having a specific surface area selected in the range of from 0.1 $m^2.g^{-1}$ to 100 $m^2.g^{-1}$.

The present invention also provides a process for obtaining ceramic pellets with good mechanical resistance in which the distribution of the metallic oxides is uniform.

A further object of the present invention is to provide a process which may be applied to the products of a nuclear fuel retreatment plant for the production of mixed fuel pellets.

The term "metallic nitrates" is used by the Applicant to designate uranyl nitrate on its own or in admixture with at least one of thorium nitrate, cerium nitrate and plutonium nitrate. Whenever denitration leads to the production of metallic oxides, it is to be understood, as mentioned above, as meaning uranium trioxide on its own or uranium trioxide in admixture with at least one of thorium oxide ($ThO_2$), cerium oxide ($CeO_2$) and plutonium oxide ($PuO_2$).

Furthermore, the specific surface area of the metallic oxide powder produced by thermal denitration, determines the reactivity of this powder with regard to subsequent physical or chemical conversions.

However, as the thermal denitration of thorium nitrate, cerium nitrate and plutonium nitrate provides the stable forms of the corresponding oxides, while the thermal denitration of uranyl nitrate provides $UO_3$ in an unstable form, the reactivity of the $UO_3$ on its own or in admixture essentially depends on the specific surface area of the $UO_3$ on its own.

Therefore, the process according to the invention sets out to control the specific surface area of the $UO_3$ on its own and consequently the reactivity of the powders containing the $UO_3$ on its own or in admixture with at least one of thorium oxide, cerium oxide and plutonium oxide.

According to the present process, the first so-called dehydration stage is effected by heating the liquid or solid medium to a maximum temperature generally in the range of from 160° C. to 300° C. and preferably in the range of from 180° C. to 270° C.

This dehydration is preferably carried out until a solid intermediate is obtained which has a maximum water content of 10% by weight of the uranium compound, and the uranium compound of which has a maximum denitration rate of 50%, the solid intermediate preferably having a maximum residual water content of 5% by weight of the uranium compound and the uranium compound of which having a maximum denitration rate of 30%.

This first dehydration stage may be advantageously carried out under reduced pressure, but carrying out dehydration under a pressure equal to or greater than atmospheric pressure, that is about 1 bar, does not impair the good quality of the results.

The solid phase obtained during the first stage is then subjected to the second stage of the process according to the invention which consists of the calcination of the said solids material at a maximum temperature generally in the range of from 260° C. to 600° C. and preferably from 300° C. to 550° C.

This stage for calcinating the solids material is carried out under controlled steam pressure which is, in general, preferably at most equal to 1 bar.

Whenever it is desired to obtain a denitrated product having a specific surface area at least equal to 15 $m^2g^{-1}$, the controlled steam pressure applied during calcination is maintained at at most 75 mm of mercury. Whenever it is desirable to obtain a denitrated product having a specific surface area at least equal to 5 $m^2.g^{-1}$, the controlled steam pressure applied during calcination is at most equal to 200 mm of mercury.

When the process according to the invention is used to produce $UO_3$ on its own having a specific surface area at most equal to 5 $m^2.g^{-1}$, the denitration stage is preferably carried out under controlled steam pressure at least equal to 110 mm of mercury.

However, when the process according to the invention is used to produce $UO_3$ on its own having a specific surface area of from 5 $m^2.g^{-1}$ to 15 $m^2.g^{-1}$, the denitration stage is preferably carried out under a steam pressure of from 35 to 200 mm of mercury.

This second calcination stage may be carried out under a total pressure preferably less than or equal to atmospheric pressure, but may also be carried out under a total pressure greater than atmospheric pressure.

The steam required during the calcination stage may generally be injected on its own or optionally in the presence of a carrier gas, such as air, nitrogen or $CO_2$, or mixtures of these gases.

However, it is possible that the steam required in the calcination stage is produced in "in situ" by self-generation, optionally in the presence of a flushing gas.

Each stage of the process according to the invention may be carried out in a continuous or discontinuous manner.

After the $UO_3$ has been reduced to $UO_2$ by, for example, hydrogen, the oxide which has thereby been reduced has very high reactivity with respect to the hydrofluoric acid used in the subsequent fluoridation stage and very good sintering capacity.

The process according to the invention is generally carried out in reactors of known type, such as plate reactors, tubular furnaces for circulating the product, fixed or fluidized beds, rotary furnaces, which may be used on their own or in conjunction with each other.

If the process according to the invention is carried out in a continuous or discontinuous manner, the gaseous effluents are evacuated as they are produced, are subsequently treated by known methods with a view to regenerating $HNO_3$ and recycling it for attack with uraniferous concentrates or reducing them catalytically in the manner described in French Pat. No. 2 370 695, which consists of converting the nitrogen oxides produced into nitrogen and steam, the emission of heat produced being used for the conversion of the uranyl nitrate to uranium trioxide.

The present invention will be better understood with reference to the following Examples given by way of illustration:

thereby enabling an exactly controlled steam pressure to be obtained in the said chamber.

Five tests are carried out covering a large range of steam pressure, from almost 0 to 160 mm of mercury.

The operating conditions and the characteristics of the products obtained are given in the following Table I:

TABLE 1

|  |  | Test No | | | | |
|---|---|---|---|---|---|---|
|  |  | 1 | 2 | 3 | 4 | 5 |
| Total pressure applied in mm of Hg (in the first stage) | | 25 | 25 | 25 | 25 | 25 |
| 1st stage dehydration | Maximum dehydration temperature in °C. | 270 | 270 | 270 | 270 | 270 |
|  | Residual H₂O content of the intermediate in % by weight | 1.2 | 1.2 | 1.2 | 1.2 | 1.2 |
|  | Denitration rate of the intermediate in % | 25 | 25 | 25 | 25 | 25 |
| 2nd stage calcination | Total pressure applied in bars | 1 | 1 | 1 | 1 | 1 |
|  | Maximum temperature in °C. | 450 | 450 | 450 | 450 | 450 |
|  | Controlled steam pressure in millimeters of mercury | 0 | 45 | 75 | 95 | 160 |
| UO₃, produced BET specific surface area in m²g⁻¹ | | 20.5 | 17.0 | 11.0 | 8.8 | 4.4 |

EXAMPLE 1

This Example illustrates for a composition of the solid intermediate obtained in the first stage, the effect of the steam pressure on the specific surface area of the uranium trioxide obtained in the second stage by incomplete dehydration and calcination of hydrated uranyl hydrate by carrying out the process according to the invention.

For this purpose, 1186 g of hexahydrated uranyl nitrate flakes were introduced into a laboratory pilot plant consisting of a reactor provided with a plate having a surface area of 0.1 m$^2$ and a stirring device, and heated by a thermal transfer liquid circulating in a double jacket.

The reactor is connected to a device for enabling the pressure to be lowered, this device being itself provided with a pressure control device.

The hexahydrated uranyl nitrate flakes are introduced into the said reactor which has been preheated to 50° C. Then after the pressure has been reduced to 25 mm of mercury, the temperature is gradually raised to 270° C. over a period of 50 minutes. It is then maintained at this temperature for 50 minutes.

With a starting material consisting of 1186 g of flakes, 845 g of a partially dehydrated intermediate are obtained which has the following characteristics:
Residual H$_2$O content: 1.2%
Denitration rate: 25.00%

Five samples, each of 16 g, are taken from the 845 g of intermediate enabling the said intermediate to be subjected, according to tests 1 to 5, to the calcination stage at a given temperature but under a variable steam pressure which is controlled in each test.

In effect the duration of calcination is held constant for each test and lasts for 40 minutes.

The steam present in the calcination chamber is produced "in situ" by injection of liquid water at a constant rate into a current of air which is also at a constant rate, thereby enabling an exactly controlled steam pressure to be obtained in the said chamber.

Thus it should be noted that by adjusting the characteristics of the intermediate within the recommended composition ranges during the first stage, a uranium trioxide is obtained, depending on the partial steam pressure applied during the calcination stage, which has a specific surface area which is correlatively linked to the value of the said partial steam pressure.

EXAMPLE 2

This Example illustrates the application of the process according to the invention for the preparation of mixtures of oxides of heavy metals having a large specific surface area, containing UO$_3$ and one or the other of thorium dioxide and cerium dioxide, which are obtained by the simultaneous treatment of corresponding hydrated metallic nitrates.

For this purpose, mixtures of nitrates of the aforementioned metals are prepared which have the following compositions:

TEST 6: Hexahydrated uranyl nitrate on its own

TEST 7: Mixtures of hexahydrated uranyl nitrate and tetrahydrated thorium nitrate in proportions such that the weight ratio U/Th is equal to 3.

TEST 8: Mixtures of hexahydrated uranyl nitrate and hexahydrated cerium nitrate in proportions such that the weight ratio U/Ce is equal to 3.

In a first stage, the nitrates are placed in a boat in the form of a layer 15 mm in thickness. The treatment chamber is subjected to reduced pressure which is maintained at 25 mm of mercury by means of a control device. The nitrates are gradually heated to a temperature of 250° C. over a period of 50 minutes and are then held at this temperature for 40 minutes.

In a second stage, atmospheric pressure is applied to the treatment chamber which is flushed by a current of dry air so as to establish an autogenous steam pressure which is stil less than 35 mm of mercury.

The intermediates are then heated to the maximum temperature of 500° C. and are held at this temperature for 40 minutes.

At the end of the two stages, powders consisting of $UO_3$ or mixtures of $UO_3$—$ThO_2$— and $UO_3$—$CiO_2$ are recovered.

The operating conditions and the characteristics of the products obtained are given in the following Table II:

TABLE II

| | Test | 6(U) | 7(U + Th) | 8(U + Ce) |
|---|---|---|---|---|
| 1st stage dehydration | Total pressure applied in mm of Hg | 25 | 25 | 25 |
| | Maxiumum dehydration temperature in °C. | 250 | 250 | 250 |
| | Residual $H_2O$ content of the single intermediate uraniferous compound in % by weight | 1.3 | | |
| | Denitration rate of the intermediate in % | 20 | | |
| 2nd stage Calcination | Total pressure applied in bars | 1 | 1 | 1 |
| | Maximum temperature in °C. | 500 | 500 | 500 |
| | Controlled steam pressure in millimeters of mercury | <35 | <35 | <35 |
| Specific BET surface area in $m^2 g^{-1}$ | | 20.2 | 25.6 | 52.8 |

Thus it appears that when the process according to the invention is applied to the treatment of nitrates of heavy metals on their own (uranyl nitrate) or in admixture, and whenever the conditions for treating the uranyl nitrate have been selected so as to obtain $UO_3$ having a given specific surface area (such as a large surface area in the case of this Example), these same conditions being applied to mixtures of nitrates, it produces mixtures of oxides having similar specific surface areas (that is large in the present case).

EXAMPLE 3

(according to the Figure)

This Example illustrates the application of the process according to the invention to an industrial process leading to the production of pellets of $UO_2$ from an aqueous uraryl nitrate solution which has been treated by the process according to the invention.

For this purpose an aqueous uranyl nitrate solution having a uranium concentration of 300 g/l is placed in a storage zone (A). This solution is introduced along $L_1$ into an evaporator under vacuum (B) with a view to concentrating this liquor until molten hexahydrated uranyl nitrate is obtained in the crystalization water thereof.

On leaving the evaporator (B), the molten uranyl nitrate flows along $L_2$ onto a cooled drum (C) which ensures the solidification of the hexahydrated uranyl nitrate in the form of flakes.

The solid $S_3$ which is thus obtained is introduced into a plate reactor (D) which operates under reduced pressure of 25 mm of mercury and at a temperature which is gradually raised from 50° to 230° C. over a period of 45 minutes and held at this maximum temperature for 35 minutes. A solid intermediate $S_4$ is obtained which contains 3.6% by weight of water and the denitration rate of which is 12%.

The intermediate $S_4$ is then introduced into a denitration reactor (E) which rotates at a rate of 50 rpm, immersed in a cooling bath at a temperature of 360° C., a reactor in which a reduced pressure of 25 mm of mercury is applied. Thus, denitration is carried out in the presence of steam originating in the medium, the pressure of which is at most equal to 25 mm of mercury.

Uranium trioxide is obtained, the specific surface area of which (measured by the BET method) is 27 $m^2.g^{-1}$.

The $UO_3$ having a large specific surface area, indicated by $S_5$, is then thermally decomposed at 600° C. to $U_3O_8$ in zone (F) in the presence of a gaseous current of impoverished air, that is to say air diluted by nitrogen (13% air, 87% nitrogen).

The oxide $U_3O_8$ which is obtained $S_6$ is subjected to grinding at (G) with a view to obtaining a pulverulent product with a granulometry which is 100% less than 15 microns.

The ground oxide $U_3O_8$ $S_7$ is then reduced to $UO_2$ in zone (H) using pure hydrogen at a temperature of 600° C.

The oxide $UO_2$ which is obtained $S_8$ is then stabilized in (I) by subjecting it to very slight reoxidation ($UO_2$ converted to $UO_{2.09}$) by contacting it with an oxidizing gaseous mixture of known type at a temperature of 40° C.

The stabilized oxide $UO_{2.09}$ $S_9$ which has a specific surface area of 8 $m^2.g^{-1}$ is pelleted at (J).

After compression to 3000 bars, the density of the pellets is 5.9.

The pellets of $UO_{2.09}$ ($S_{10}$) are then sintered at (K) by holding them at a temperature of 1700° C. for 4 hours in a current of hydrogen.

The sintered pellets $S_{11}$ from the sintering zone (K) have a density of 10.7 in their sintered state.

We claim:

1. A process for the preparation of pulverulent metallic oxides having a selected specific surface area by thermal denitration of metallic nitrates selected from the group consisting of hydrated uranyl nitrate and hydrated uranyl nitrate in admixture with at least one other nitrate selected from the group consisting of thorium, cerium and plutonium comprising a first step of heating said metallic nitrates to a temperature between 160° and 300° C. to at least partially dehydrate said dehydrated uranyl nitrate and a second step of calcining the product resulting from said first step by heating the product at a temperature between 260° and 600° C., while subjecting the product to steam pressure, said steam pressure being at most equal to one bar with the amount of steam pressure being selected depending upon the desired specific surface area of the pulverulent metallic oxide(s).

2. A process according to claim 1 wherein said metallic nitrates are heated in said first step until a solid intermediate is obtained which has a maximum water content of 10% by weight of the uranium compound and the uranium compound of which has a maximum denitration rate of 50%.

3. A process according to claim 2, wherein the solid intermediate obtained has a maximum residual water content of 5% by weight of the uranium compound and the uranium compound of which has a maximum denitration rate of 30%.

4. A process according to claim 1 wherein the first step is carried out under reduced pressure.

5. A process according to claim 1 wherein the first step is carried out under pressure at least equal to 1 bar.

6. A process according to claim 1 wherein the steam pressure during the second step is at most equal to 75 mm of mercury in order to obtain a denitrated product with a specific surface area at least equal to 15 $m^2g^{-1}$.

7. A process according to claim 1 wherein the steam pressure during the second step is at most equal to 200 mm of mercury in order to obtain a denitrated product with a specific surface area at least equal to 5 $m^2g^{-1}$.

8. A process according to claim 1 wherein the metallic nitrate is hydrated uranyl nitrate and the steam pressure during the second step is at least equal to 110 mm of mercury in order to obtain uranium trioxide with a specific surface area at most equal to 5 $m^2g^{-1}$.

9. A process according to claim 1 wherein the metallic nitrate is hydrated uranyl nitrate and the steam pressure during the second step is from 25 to 200 mm of mercury in order to obtain uranium trioxide with a specific surface area of from 5 $m^2g^{-1}$ to 15 $m^2g^{-1}$.

10. A process according to claim 1 wherein the second step is carried out under a total pressure at most equal to atmospheric pressure.

11. A process according to claim 1 wherein the second step is carried out under a total pressure of more than atmospheric pressure.

12. A process according to claim 1 wherein the steam is introduced during the second step.

13. A process according to claim 1 wherein the steam is formed "in situ" during the second step.

14. A process according to claim 1 wherein said metallic nitrates are heated in said first step to a maximum temperature of from 180° C. to 270° C.

15. A process according to claim 1 wherein the maximum calcination temperature is from 300° to 550° C.

* * * * *